J. F. FLANDERS.
MACHINE FOR SMOOTHING OUT HIDES PREPARATORY TO TANNING.
No. 40,680. Patented Nov. 24, 1863.
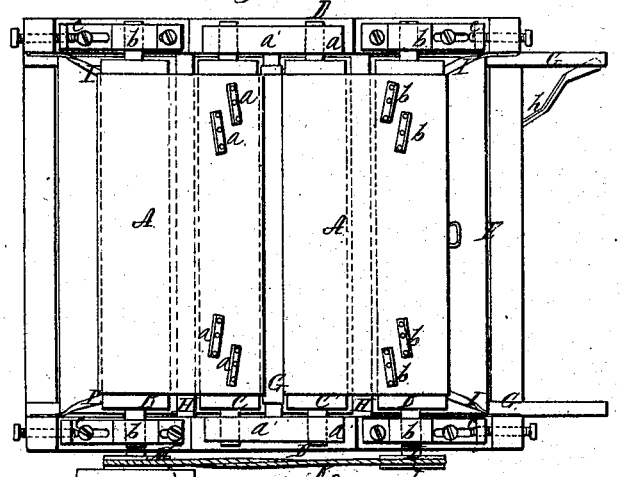
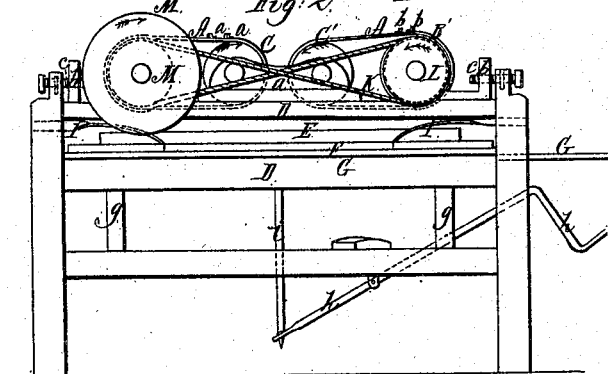
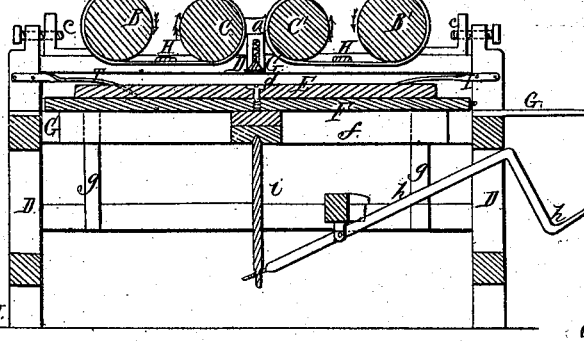
Witnesses:
Inventor:

UNITED STATES PATENT OFFICE.

JOSEPH F. FLANDERS, OF BOSTON, MASSACHUSETTS.

MACHINE FOR SMOOTHING OUT HIDES PREPARATORY TO TANNING.

Specification of Letters Patent No. 40,680, dated November 21, 1863.

*To all whom it may concern:*

Be it known that I, JOSEPH F. FLANDERS, a resident of Boston, in the county of Suffolk, and State of Massachusetts, have made a new and useful Invention of Machinery for Sleeking or "Putting Out" and Otherwise Treating Hides or Skins; and I do hereby declare the same to be fully described in the following specification and represented in the accompanying drawings, of which—

Figure 1, is a top view; Fig. 2, a side elevation, and Fig. 3, a vertical and longitudinal section of it.

The technical terms "sleeking" or "putting out" hides or skins, are well understood by those whose business it is to tan, curry and dress skins or leather, each of such technical terms being indication of a peculiar operation on the skins or hides, by which, by manual labor, a workman, by means of a sleeking tool rubs out the wrinkles of a skin and stretches or extends it in various directions more or less, while it may be spread or laid on a table or bed.

My machine is intended to accomplish automatically and with far greater precision and expedition, the said process, or operation of "putting out or sleeking" a skin or hide.

By using brushes in the place of the sleekers, a machine of the kind may often be employed to good advantage for washing or cleansing and even for coloring the surface of a skin or hide.

The machine constructed as exhibited in the drawings, has two endless sleeking aprons A, A', each being provided with a series of sleekers, $a, a, a, b, b, b$, arranged on it as shown in Figs. 1, and 3. Each of these aprons is supported by means of two horizontal rollers B, C, or B', C'. The two rollers, C, C', of the aprons have their journals supported in stationary boxes, $a'$, $a'$, upheld by the frame D, of the machine. The journals of each of the two outside rollers, B, B', are supported in two adjustable boxes, $b$, $b$, which by means of screws, $c$, $c$, may be drawn away from the boxes $a'$, $a'$, in order to tightly strain the endless aprons on their supporting rollers. Underneath the two endless aprons there is a table, E, which at its center is pivoted to a movable carriage, F, which is supported on parallel ways or rails G, G, extending lengthwise of the machine. The connection, $d$, of the table E, with the said carriage F, is such as to enable the table to be freely revolved horizontally underneath the sleeking aprons in order that a skin or hide while on the table may be turned around horizontally as occasion may require to sleek or operate on it in various directions. The carriage, F, is provided with a means of or mechanism for elevating it toward the sleeking aprons the object of such elevating mechanism being to press a skin or hide, while it may be on the table and subjected to the operation of the sleeking aprons, closely up to the latter.

The elevating mechanism consists of a cross or frame, $f$, (which is arranged underneath the carriage and supported by suitable vertical guides, $g$, $g$, applied to the frame of the machine) a foot lever $h$, and a pitman $i$. The said pitman extends vertically from the center of the cross down to the shorter arm of the foot lever. By a person or attendant of the machine pressing his foot on the longer arm of the foot lever the cross as well as the carriage and its table will be forced upward.

A pressure bar or presser G, which may act either by its own weight or by one or more springs applied to it to press it downward is arranged between the two endless sleeking aprons and extends transversely across the frame of the machine. The object of this bar is to hold the skin or hide down at or across its middle while it may be in the act of being drawn and sleeked in opposite directions as well as to prevent it from wrinkling during the process of revolving or turning the table. There is also another bar (H) arranged between the two rollers of each endless apron and transversely of the machine, and directly on the lower straight part of such apron, the object of such bar being to keep the sleekers in proper contact with the skin or hide while passing horizontally over it. Furthermore, a spring I, attached to each post of the frame of the machine, projects over, and upon the carriage or its table, and serves not only to depress but to steady the same.

A crossed endless band, K, works around pulleys L, M, fixed on the shafts of the outermost rollers of the two endless sleeking aprons, the same being so that while one of the rollers may be put in rotation a simultaneous rotary motion may be communicated to the other, but in a contrary direction. In this way, one of the two endless sleeking aprons will be revolved in a direction opposite to that of the other as indicated by arrows in the drawings.

The sleeking tools or sleekers, *a, a, a, b, b, b,* are scrapers or such like contrivances fastened to the outer surface of each one of the endless sleeking aprons. Each of such sleekers on either half of its apron inclines toward the outer end of the apron, but those on one half of the apron incline in directions opposite to those of the other half of it, the same being as shown in Fig. 1. So also, the sleekers of one row are intended to be opposite the spaces between those of the next adjacent row of sleekers.

A machine may be made with but one of the sleeking aprons, and be a serviceable machine, but with two of such aprons and one of them operated or rotated in a direction opposite to that of the other, the skin or hide will be drawn each way from its middle or center, and in this manner it will be sleeked or "put out" to much better advantage.

I claim—

1. A combination of two endless sleeking aprons, A, A', and machinery for rotating them in opposite directions, with a table (E) (or its equivalent) for supporting the skin or hide, the same being so that while such aprons may be revolving and the said hide may be brought into contact with the sleekers of the aprons, it shall be sleeked or "put out" by them as described.

2. I also claim a combination composed not only of one or two endless sleeking aprons (A, A') (or the mechanical equivalent thereof) and mechanism for rotating or operating such apron or aprons or the equivalent thereof, but a table or bed (E) (for supporting a skin or hide) and a mechanism for elevating the table or bed so as to force the skin or hide into contact with the sleeking mechanism.

3. I also claim in combination with one or more sleeking parons (A, A') a rotary table (E) and a means of supporting and sliding it underneath the sleeking apron or aprons.

4. I also claim the combination of one or two sleeking aprons (A, A') their table (E) and a presser or pressure bar (G) to operate substantially in manner and for the purpose as specified.

5. I also claim the combination of steadying and restoring springs (I) or their mechanical equivalents with the table or its carriage, and the sleeking apron or aprons the whole operating substantially as and for the purpose set forth.

6. I also claim the arrangement and combination of one or more bars (H) or the mechanical equivalent thereof, with the sleeking apron, its supporting rollers and the table beneath them.

7. I also claim the arrangement of the sleekers (*a, a, a, b, b, b,*) on the apron, whereby, while in operation they shall be caused to scrape or press the hide more or less in lateral as well as in longitudinal directions.

J. F. FLANDERS.

Witnesses:
R. H. EDDY,
D. E. CONERY.